United States Patent Office 3,509,427
Patented Apr. 28, 1970

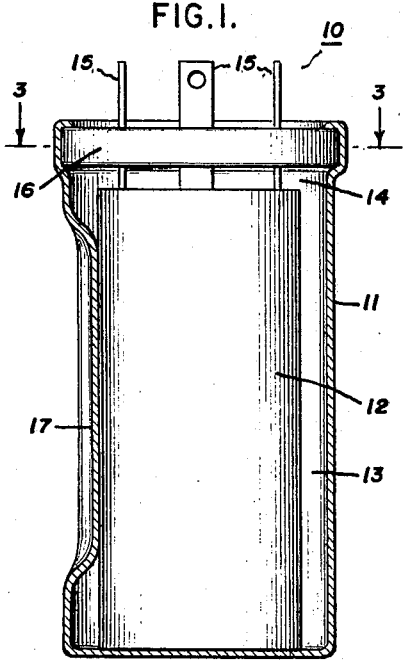
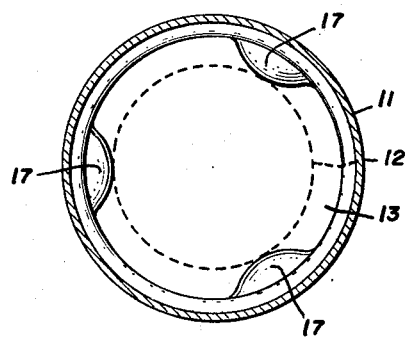
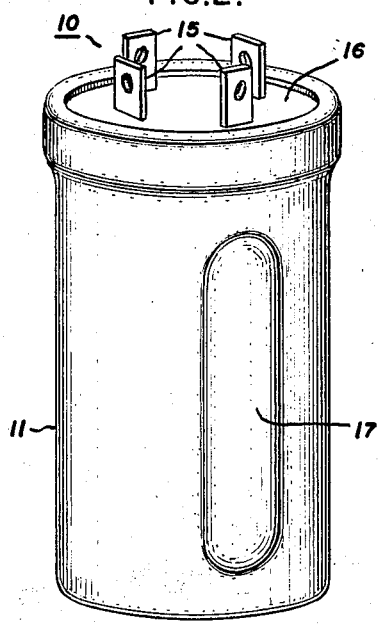
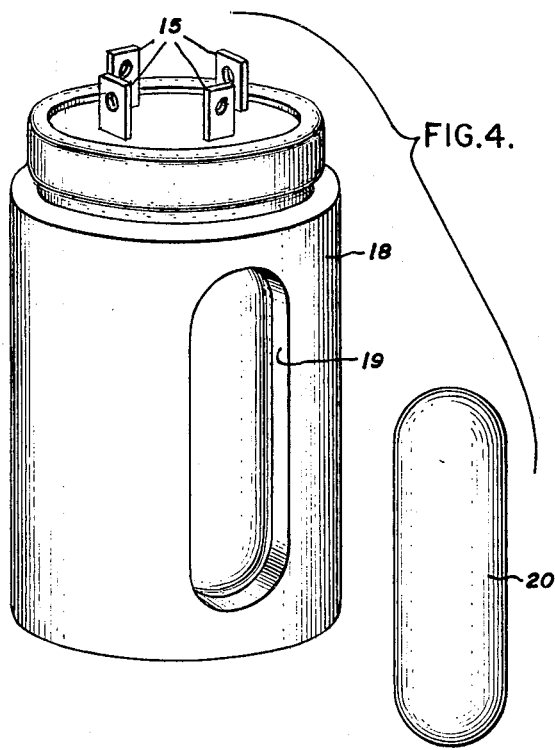

3,509,427
ELECTROLYTIC CAPACITOR CASING STRUCTURE
Ralph A. Ruscetta, Columbia, S.C., assignor to General Electric Company, a corporation of New York
Filed May 21, 1968, Ser. No. 730,740
Int. Cl. H10g 1/02
U.S. Cl. 317—230                        13 Claims

ABSTRACT OF THE DISCLOSURE

An electrolytic capacitor tubular casing incorporates one or more inwardly protruding indentations which support a capacitor section in the casing.

BACKGROUND OF INVENTION

This invention relates to electrolytic capacitors having a tubular casing structure wherein indented portions of the casing are utilized to support a capacitor section in the casing, and more particularly to indentations of the kind which permits free flow of electrolyte through the casing and therefore an interrupted volume in the casing.

DESCRIPTION OF PRIOR ART

Electrolytic capacitors incorporating a wet electrolyte ordinarily require a predetermined unfilled volume in their casing or housings to provide for the accumulation of gases which may be generated during capacitor operation. Since this unfilled volume is usually provided by having a casing which is larger than the capacitor section therein, a supporting member is utilized to fixedly support the capacitor section in the casing. The supporting member may be an asphalt compound which is poured in place. Such a compound must be chosen with care for the purpose of compatibility with the electrolyte and other materials within the casing. At the same time the material must be effective to fixedly maintain the capacitor section in position under varying operating conditions. Other supporting members in the form of solid spacers may also be employed. However, where such capacitors are made in a number of different case sizes, either a variable amount of a poured-in-place material must be used, or solid spacers must be made up in configurations of different or easily extensive dimensions. In either instance the supporting member must not isolate or seal off sections of the casing to prevent free interchange of electrolyte and accumulated gases.

SUMMARY OF INVENTION

Accordingly it is an object of this invention to provide an improved electrolytic capacitor case structure.

It is another object of this invention to provide an improved indented casing structure for electrolytic capacitors.

It is still another object of this invention to provide a casing indentation support structure for a capacitor section where the indentations do not isolate or seal off any casing volume.

It is yet another object of this invention to provide longitudinal indentations in a capacitor casing as capacitor section positioning means.

Briefly described, this invention in one of its more preferred forms includes an electrolytic capacitor having a tubular casing of a valve metal such as aluminum. The casing may be cup shaped or open at each end. Intermediate its ends, three longitudal grooves, equidistantly peripherally spaced are formed in the casing by a suitable metal deforming process such as for example a punch and die method. Thereafter a capacitor section of the roll type is inserted into the casing to be fixedly retained by the groove walls.

DESCRIPTION OF DRAWINGS

This invention will be more fully understood when taken in connection with the following description and the drawings in which:

FIGURE 1 discloses a cross sectional view of one preferred form of this invention.

FIGURE 2 is an external view of the casing of FIGURE 1.

FIGURE 3 is an illustration of the interior of the casing of FIGURE 1 from the open upper end thereof.

FIGURE 4 is an illustration of one form of apparatus useful in providing indentations for this invention.

DESCRIPTION OF PREFERRED EMBODIMENTS

Referring now to FIGURE 1 there is disclosed an electrolytic capacitor 10 including a tubular casing 11 of a valve metal such as aluminum, tantalum, titanium or other valve metal, and in one embodiment of this invention, aluminum. Casing 11 may also be of a number of other materials which are compatible with the electrolyte, one example being silver, or a casing of one metal may have a further metal coating on the internal surfaces. In some instances, however, the casing may also be of a nonmetal such as a plastic, for example a polyolefin. Within casing 11 there is included a capacitor roll section 12 comprising rolled alternate strips of a porous separator such as paper or gauze, and a valve metal foil such as aluminum. As illustrated in FIGURE 1, the roll section 12 is spaced radially from the casing wall to define an open volume 13. An end volume 14 may also be provided at one or both ends of casing 11. This spacing is necessary for a number of reasons including providing a necessary volume for the electrolyte of the capacitor, as well as to provide for temperature expansion and gas accumulation.

Prior capacitors of the kind disclosed utilized an additional material in the casing to retain the capacitor roll section in place. This material usually took the form of a spacer of paper or resin materials, as well as poured in place materials, of asphalt for example, which is positioned in one end of the casing. The roll section 12 is axially retained within the casing 11 by the asphalt material at one end and the capacitor leads 15 or the plug seal 16 at the other end.

Variation in capacitor sizes leads to the necessity of providing numerous casing sizes as well as spacing materials of different sizes. In addition, such materials must be carefully chosen because of potential adverse reaction with electrolyte materials.

In accordance with one form of this invention, after assembly of roll section 12 in casing 11, the casing is suitably radially inwardly deformed to retain the roll section in spaced relation therein. Deforming of the casing must be done with due care in order to minimize any damage or injury to the oxide coating on the anode foil of the roll section 12. The maximum projection of the indentations do not significantly compress the capacitor roll 12 and the deformed portions are well rounded and relatively large to avoid the sharp corners and bends usually associated with oxide cracking.

As illustrated in FIGURES 1, 2 and 3, three equally peripherally spaced axial grooves or troughs 17 are formed in casing 11 to retain capacitor roll section 12 in position. Each groove is well rounded to provide a generally U-shaped cross sectional configuration. In one example a casing tube section of about 1⅜ inch outside diameter includes grooves as defined of about ⅛ inch depth, 1½ inch long and about ½ inch wide at widest part of the groove.

FIGURE 2 illustrates a fully assembled capacitor in accordance with this invention wherein two of three equally peripherally spaced grooves are shown. In this configuration, the grooves extend along almost the total length of the capacitor roll section 12 therein.

FIGURE 3 is an illustration of the interior of a casing viewed from the open end thereof. Indentations 17 are illustrated as well rounded protuberances which slightly indent the dotted outline of a capacitor section 12 therein. Indentations 17 also define an uninterrupted or free volume in casing 12; although such uninterrupted volume may be tortuous as well as straight, as illustrated.

The groove indentations 17 not only position the capacitor roll section 12 in the casing 11, but also serve as additional heat conducting means to transmit internal heat to the casing. The use of larger casing and grooves therein also proved additional heat radiating capacity for the capacitor. The number of grooves 17 may be varied to accommodate different capacitor roll sections. One groove may be adequate for various applications while the number may extend to include corrugated casings having a relatively large number of convolutions.

It is an important feature that the grooves 17 do not separate the internal volume of the capacitor with two or more relatively sealed sections, such as may occur with the use of circumferential grooves. Provision must be made to retain the free flow of electrolyte along the length of the casing as well as not to seal off any particular volume in the casing without means to accommodate rapid expansion of the material under high temperature conditions, or the generation of gases.

Other forms of indentations may be provided ranging from one or more regularly or randomly located dimples or short section grooves. These indentations may be arranged in either axial or circumferential relationship, or combinations thereof. Spiral or helical, continuous or discontinuous, grooves may also be employed. The described indentation configuration may further be in the form of kinked or flattened portions of the casing, as for example compressing the casing simultaneously from opposite directions. The preferred indentation is one that preserves the original, usually circular, ends of the casing as well as preserving the generally circular configuration of the casing. The indentations are defined as protruding inwardly from a defined circle.

When the grooves or indentations are predeterminedly arranged or positioned to provide visual or physical orientation of the capacitor, they become useful locating indicia either in the subsequent assembly or testing of the capacitor or in the subsequent assembly of the capacitor in its defined circuit. Such indicia may be for example used in identifying the location of certain of the leads or terminals of the capacitor.

The indentations in the casing may also serve as an electrical connection for the roll section. For example roll section 12 may be wound with the cathode foil strip longer than the anode strip. In the finished roll the longer foil strip appears about the outer periphery of the roll. Accordingly indentation of the case brings the indented portion of the case into engagement with the foil of the roll and the casing becomes one connection or terminal for one of these foils. Suitable provision must be made to prevent or exclude oxidation of the parts to be joined or its effective removal upon joining. Ultrasonic welding may be utilized to join the oxidized parts as well as vigorous rotation of the casing about the section to remove the oxide coating at points of contact with the indentations. Preferably the casing and the electrode foil may be of a similar or the same metal such as aluminum.

In one preferred practice of this invention the indentations are provided after the capacitor section 12 is inserted in the casing, and usually after full assembly of the capacitor 10. The depth of the indentations are adjusted so as to contact the capacitor section 12 with the proper restraining force. A number of processes may be employed to provide suitable indentations. A suitable apparatus for carrying out this process is shown in FIGURE 4.

Referring now to FIGURE 4 there is illustrated a hollow cylinder 18 having three slots 19 therein corresponding to the grooves 17 of FIGURES 1, 2 and 3. This cylinder 18 is adapted to restrain a capacitor therein while indentation means in the form of punch elements 20 pass therein to indent the capacitor. The cylinder 18 not only restrains the capacitor section therein, but also preserves the circular configuration of the casing 11 and the ends thereof. Where the casing 11 is of a resin or plastic material such as polypropylene the indentation may be provided by heat deformation of the casing after capacitor assembly or prior thereto. With a nonconducting casing a separate lead must be employed for the cathode foil.

After indentation, the capacitor may undergo further processing, usually as a part of its testing procedure, which will serve to further oxidize the anode foil in the event of any rupture of the oxide during the indentation as described.

While the present invention has been described with reference to particular embodiments thereof, it will be understood that numerous modifications can be made by those skilled in the art without actually departing from the scope of the invention.

What I claim as new and desire to secure by Letters Patent of the United States is:

1. An electrolytic capacitor comprising in combination:
   (a) an electrolytic capacitor casing having an electrolyte therein;
   (b) a capacitor section in said casing and spaced from the wall thereof; and
   (c) indention means in said casing supporting said capacitor section in spaced relation in said casing and defining an unobstructed space therein for said electrolyte.

2. The invention as recited in claim 1 wherein said casing is a nonmetal.

3. The invention as recited in claim 2 wherein said casing is a synthetic resin.

4. An electrolytic capacitor comprising in combination:
   (a) a metal electrolytic capacitor casing having an electrolyte therein;
   (b) a roll type capacitor section in said casing comprising alternate strips of electrode foils and porous sheet material impregnated with an electrolyte;
   (c) said capacitor section being radially spaced from said casing;
   (d) and indentation means in said capacitor section fixedly positioning said capacitor roll spaced within said casing for an unobstructed space therein for said electrolyte.

5. The invention as recited in claim 4 wherein said metal is principally a valve metal.

6. The invention as recited in claim 5 wherein said foil strips are principally aluminum.

7. The invention as recited in claim 4 wherein said indentation means is defined by at least one external axially extending groove in said casing.

8. The invention as recited in claim 7 wherein at least three peripherally spaced grooves define said indention means retaining said capacitor section in position.

9. The invention as recited in claim 7 wherein said groove extends transversely of the axis of said casing.

10. The invention as recited in claim 4 wherein said indentation means is located in said casing to provide orientation indicia means for use of said capacitor.

11. The invention as recited in claim 4 wherein said indentation means engages the cathode foil of said capacitor roll section to provide said casing as a terminal means.

12. The invention as recited in claim 7 wherein said groove engages said capacitor section over substantially the total length of said roll section.

13. The invention as recited in claim 1 wherein said indentation means follows the circular shape of the tubular casing.

References Cited

UNITED STATES PATENTS

| | | | |
|---|---|---|---|
| 2,609,426 | 9/1952 | Bugel | 317—230 |
| 3,386,014 | 5/1968 | Burger et al. | 317—230 |
| 3,400,305 | 9/1968 | Coffman | 317—231 |

JAMES D. KALLAM, Primary Examiner

U.S. Cl. X.R.

317—233

UNITED STATES PATENT OFFICE
CERTIFICATE OF CORRECTION

Patent No. 3,509,427                                            April 28, 1970

Ralph A. Ruscetta

It is certified that error appears in the above identified patent and that said Letters Patent are hereby corrected as shown below:

Column 4, lines 36 and 65, "indention", each occurrence, should read -- indentation --.

Signed and sealed this 23rd day of February 1971.

(SEAL)
Attest:

Edward M. Fletcher, Jr.                                    WILLIAM E. SCHUYLER, JR.
Attesting Officer                                                 Commissioner of Patents

Dedication 3,509,427.—*Ralph A. Ruscetta*, Columbia, S.C. ELECTROLYTIC CAPACITOR CASING STRUCTURE. Patent dated Apr. 28, 1970. Dedication filed Oct. 9, 1974, by the assignee, *General Electric Company*. Hereby dedicates to the Public the remaining term of said patent.
[*Official Gazette April 1, 1975.*]